(12) United States Patent
Tingskog

(10) Patent No.: US 6,685,006 B1
(45) Date of Patent: Feb. 3, 2004

(54) CLOSED BELT CONVEYOR OPERATING IN A 3-D SPACE

(75) Inventor: Lennart Tingskog, Råå (SE)

(73) Assignee: AS-C Materials Handling Ltd., Stockport (GB)

(*) Notice: Subject to any disclaimer, the term of this patent is extended or adjusted under 35 U.S.C. 154(b) by 0 days.

(21) Appl. No.: 10/130,217

(22) PCT Filed: Nov. 10, 2000

(86) PCT No.: PCT/SE00/02199
§ 371 (c)(1),
(2), (4) Date: Jul. 23, 2002

(87) PCT Pub. No.: WO01/36305
PCT Pub. Date: May 25, 2001

(30) Foreign Application Priority Data

Nov. 15, 1999 (SE) .............................................. 9904118

(51) Int. Cl.[7] ........................ B65G 37/00; B65G 15/08; B65G 15/40
(52) U.S. Cl. ..................... 198/585; 198/819; 414/140.9
(58) Field of Search ................................. 198/585, 588, 198/812, 819; 414/140.9, 142.2

(56) References Cited

U.S. PATENT DOCUMENTS

| 5,060,787 A | 10/1991 | Tingskog | |
|---|---|---|---|
| 5,320,471 A | * 6/1994 | Grathoff | .................. 414/140.9 |
| 5,351,810 A | 10/1994 | Tingskog | |
| 5,400,899 A | 3/1995 | Tingskog | |
| 5,465,830 A | * 11/1995 | Tingskog | .................... 198/819 |

FOREIGN PATENT DOCUMENTS

WO   WO93/15983 A1   8/1993

* cited by examiner

Primary Examiner—Gene O. Crawford
(74) Attorney, Agent, or Firm—Burns, Doane, Swecker & Mathis, L.L.P.

(57) ABSTRACT

A belt conveyor comprises an endless and closed conveyor belt (25) which is flexible essentially merely about axes which are parallel with the transverse direction of the belt (25), a tower (2; 70, 75); an inner arm (3; 64) supported by the tower (2; 70, 75); and an outer arm (6; 66) supported by the inner arm (3; 64) and positioned substantially in a vertical plane through the inner arm (3; 64). The conveyor belt (25) follows a path from the tower (2; 70, 75), via the inner arm (3; 64) and the outer arm (6; 66) to a distal end of the outer arm (6; 66) and back via the outer arm (6; 66) and the inner arm (3; 64) to the tower (2; 70; 75). Two first deflection rollers (10, 11; 65, 68) for the conveyor belt (25) are supported side by side at an intersection of the inner arm (3; 64) and the outer arm (6; 66) and has a common axis of rotation (12, 13) which is perpendicular to said vertical plane. A first terminal roller (8; 67) for the conveyor belt (25) is supported at a distal end (20) of the outer arm (6; 66) and has an axis of rotation (19), which is positioned in said vertical plane.

18 Claims, 12 Drawing Sheets

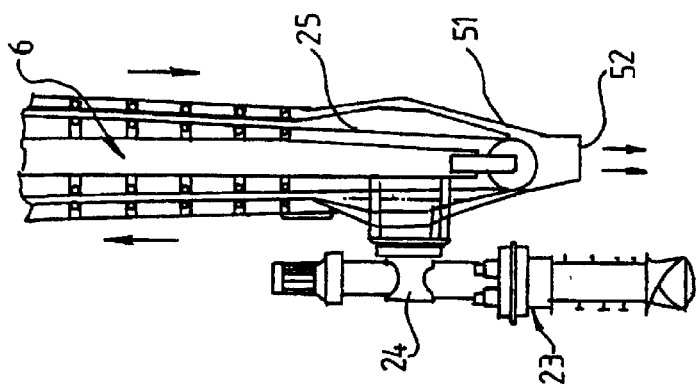
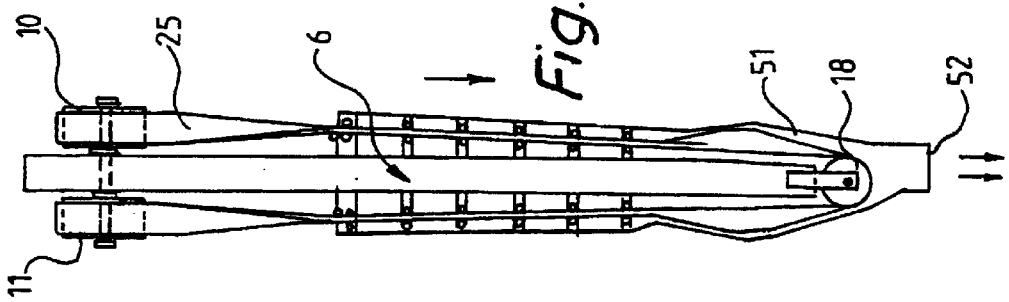
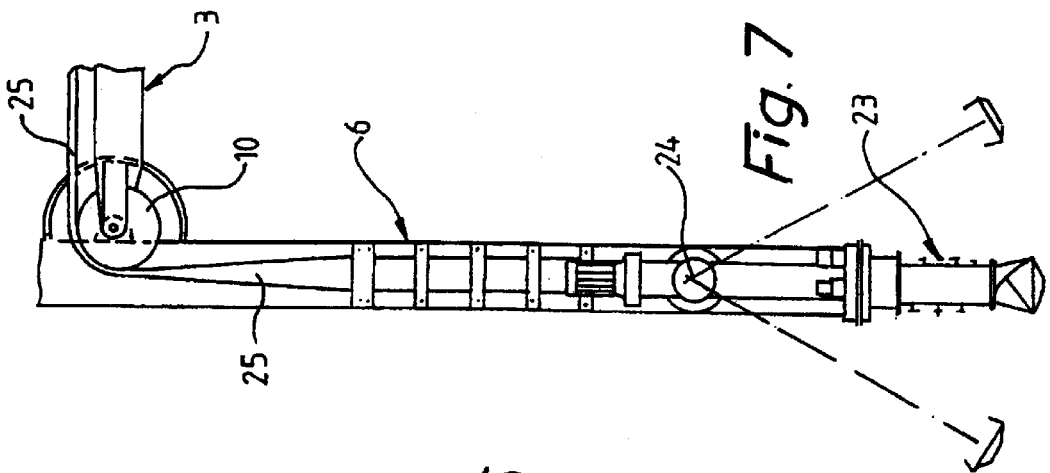
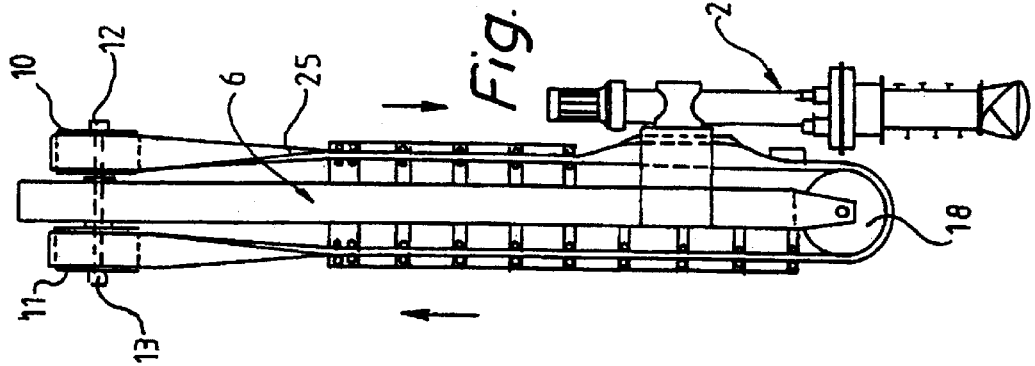

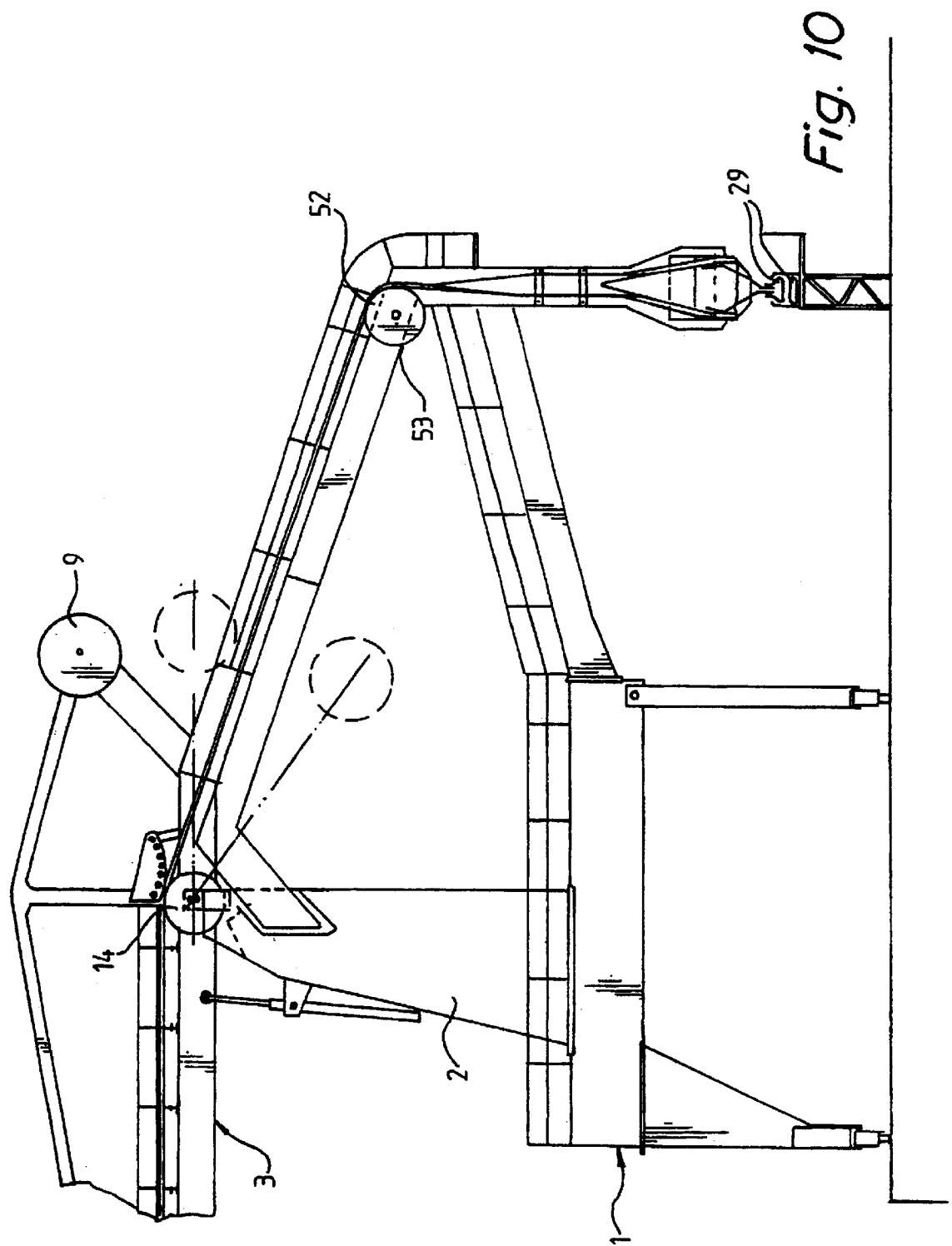

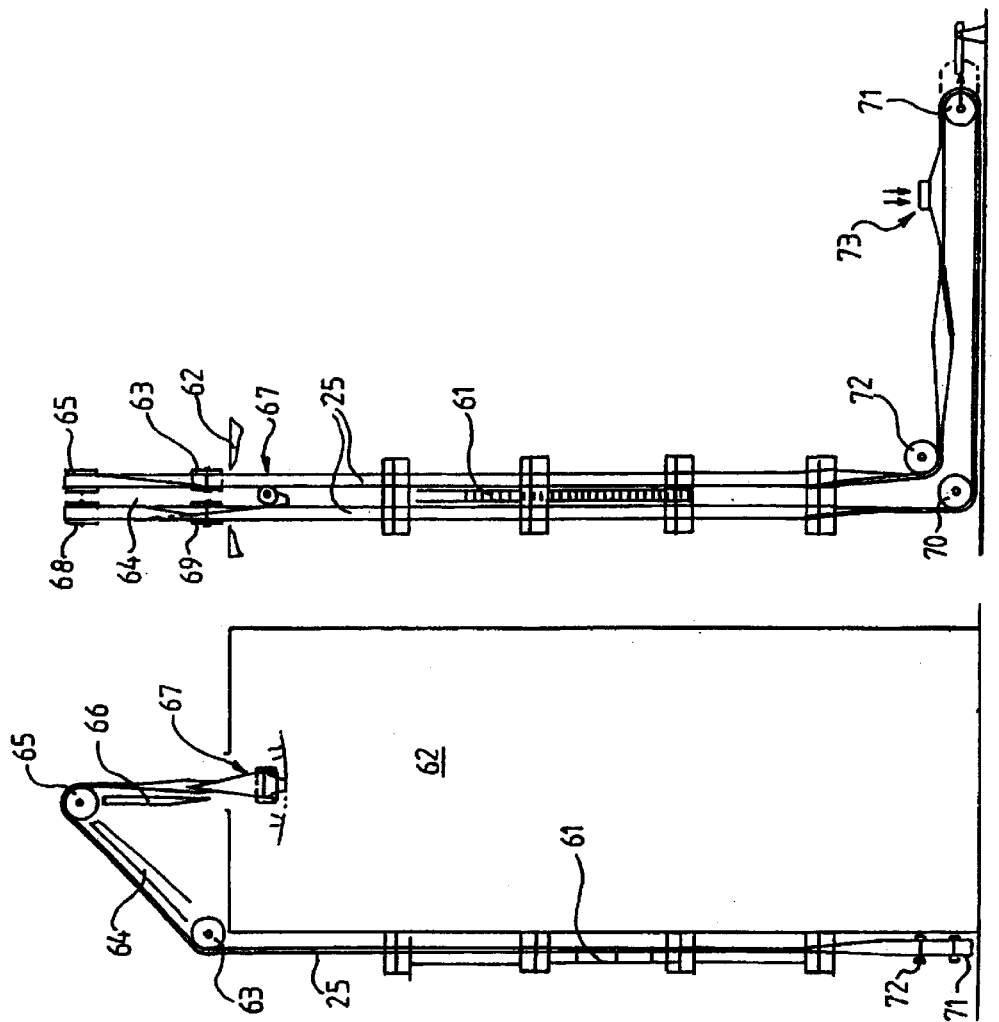

CLOSED BELT CONVEYOR OPERATING IN A 3-D SPACE

The present invention relates to a belt conveyor comprising an endless and closed conveyor belt, which is flexible essentially merely about axes, which are parallel with the transverse direction of the belt. This flexibility is a consequence of that the cross-section of the conveyor belt in the closed state thereof has a larger width, i.e. the dimension in the transverse direction of the conveyor belt, than height, i.e. the dimension of the conveyor belt perpendicular to said transverse direction.

A belt conveyor according to the present invention further comprises a tower, an inner arm supported by the tower, and an outer arm supported by the inner arm and positioned substantially in a vertical plane through the inner arm, the conveyor belt following a path from the tower, via the inner arm and the outer arm to a distal end of the outer arm and back via the outer arm and the inner arm to the tower.

Conveyor belts of the above type are described in, for instance, U.S. Pat. Nos. 5,060,787, 5,351,810 and 5,400,899, hereby incorporated by reference. The conveyor belt preferably is of a type disclosed in any one of these U.S. patents. Such a conveyor belt substantially consists of an elastic material, such as rubber, and comprises a planar central part, two planar edge parts and two hinge parts.

The central part is flexurally rigid about the longitudinal axis of the belt by means of a transverse reinforcement and has low extensibility in the longitudinal direction by means of a longitudinal reinforcement. Consequently, the outer side of this central part forms the pulling power take-up side of the conveyor belt, which preferably should make direct contact with each roller that the conveyor belt passes over.

The two planar edge parts are each hingedly connected with a side edge of the central part and flexurally rigid about the longitudinal axis of the belt by means of a transverse reinforcement. The edge parts are further extensible in the longitudinal direction of the belt and have a total width, which is at lest equal to the width of the central part, thereby enabling a complete closure of the conveyor belt.

The two hinge parts connect each edge part with the central part and are flexible about the longitudinal axis of the conveyor belt and also extensible in the longitudinal direction of the conveyor belt. Preferably, the hinge parts are further resilient for pivoting the edge parts out from a position folded towards the central part, and have a substantially smaller width than the central part.

In its closed state, the endless conveyor belt thus is flexible essentially merely about axes, which are parallel with the transverse direction of the belt. This flexibility is a consequence of that the cross-section of the conveyor belt in the closed state thereof has a larger width, i.e. the dimension in the transverse direction of the conveyor belt, than height, i.e. the dimension of the conveyor belt perpendicular to said transverse direction.

Thus, each one of these belts is designed to be bent, in its closed state, rather in the one than in the other direction about an axis parallel to its transverse direction. The conveyor belt should therefore be passed around a deflection roller with contact between one side of belt, i.e. the pulling power take-up side, and the deflection roller. In order to obtain this optimal positioning of the belt relative to a deflection roller, the belt may have to be twisted around its longitudinal axis 180°, which may require a substantial length making the belt conveyor larger than desired. Also, when parts of such a conveyor belt extend along parallel planes, a twisting of those parts results in a lateral bending thereof, i.e. a bending in a plane defined by the transverse and longitudinal directions of the conveyor belt, requiring a dynamic elastic deformation of the conveyor belt.

Belt conveyors of the above type are, among other things, used for loading and unloading of ships moored alongside a quay. The may also be used for conveying goods to or from a depot, on the ground, or to a depot within a silo.

One object of the present invention is to enable a reduction of the length or height of the known belt conveyors using conveyor belts of the above type while still following their optimal bending patterns.

Thus, two first deflection rollers for the conveyor belt are supported side by side at an intersection of the inner arm and the outer arm and have a common axis of rotation which is perpendicular to said vertical plane. Further, a first terminal roller for the conveyor belt is supported at a distal end of the outer arm and has an axis of rotation, which is positioned in said vertical plane. As a result, the conveyor belt need be twisted only 90° in the paths between the first terminal roller at the distal end of the outer arm and each one of the two first deflection rollers at the intersection of the outer arm and the inner arm.

Preferably, the outer arm is pivotable in said vertical plane about an axis perpendicular to said vertical plane at an intersection of the outer arm and the inner arm.

Also, the inner arm preferably is pivotable in said vertical plane about an axis supported by the tower and perpendicular to said vertical plane. In this case, the tower should support two second deflection rollers for the conveyor belt side by side with an axis of rotation common to the axis supported by the tower for the pivoting of the inner arm.

A second terminal roller for the conveyor belt having an axis of rotation which is positioned substantially in said vertical plane, may be supported below the two second deflection rollers and closing the conveyor belt path.

Two third deflection rollers for the conveyor belt having a common axis of rotation parallel to the common axis of rotation of the two second deflection rollers, may be positioned between the two second deflection rollers and the second terminal roller, thereby enabling a shifting of the position of the second terminal roller in relation to the two second deflection rollers.

Two further deflection rollers having axes of rotation that are substantially parallel with said vertical plane, may be supported below the two second deflection rollers for deflection of the conveyor belt along a path extending substantially perpendicular to said vertical plane between two further terminal rollers. This will result in a belt conveyor which constitutes the single conveyor between a loading/unloading station and an unloading/loading station, i.e. requiring no transfer of the goods to another conveyor.

The conveyor belt may follow a path via at least one other deflection roller between each one of the second deflection rollers and the corresponding deflection roller of said further deflection rollers.

The tower may also be movable along a path extending perpendicular to said vertical plane.

Also, the tower may be rotatable about a vertical axis.

In this context, terminal roller is intended to mean a roller where the conveyor belt turns about 180° while a deflection roller is a roller, which provides a less turn of the conveyor belt. Further, the conveyor belt should preferably pass around a terminal roller in an open state, i.e. carrying no load. However, the conveyor belt will pass around a terminal roller in a closed state if loading is made before, and unloading after passage of a terminal point. The belt can also be made to pass a terminal roller in a closed state in order to avoid dust or spillage.

This invention and its other aspects and advantages will now be described with reference to the attached drawings, in which:

FIG. 6 is a front end view of an alternative embodiment of an outer arm of the belt conveyors shown in FIGS. 1–5;

FIG. 7 is a partial side view of the alternative embodiment of the outer arm shown in FIG. 6.

FIG. 8 is a front end view of an other alternative embodiment of an outer arm of the belt conveyor shown in FIG. 3–5;

FIG. 9 is a front end view of still an other alternative embodiment of an outer arm of the belt conveyor shown in FIG. 3–5;

FIG. 10 is a partial side view of a third embodiment of a belt conveyor for unloading according to the present invention;

FIG. 12 is a side view of a fifth embodiment of a belt conveyor for loading according to the present invention;

FIG. 13 is a front end view of the belt conveyor shown in FIG. 12;

Figure 1:
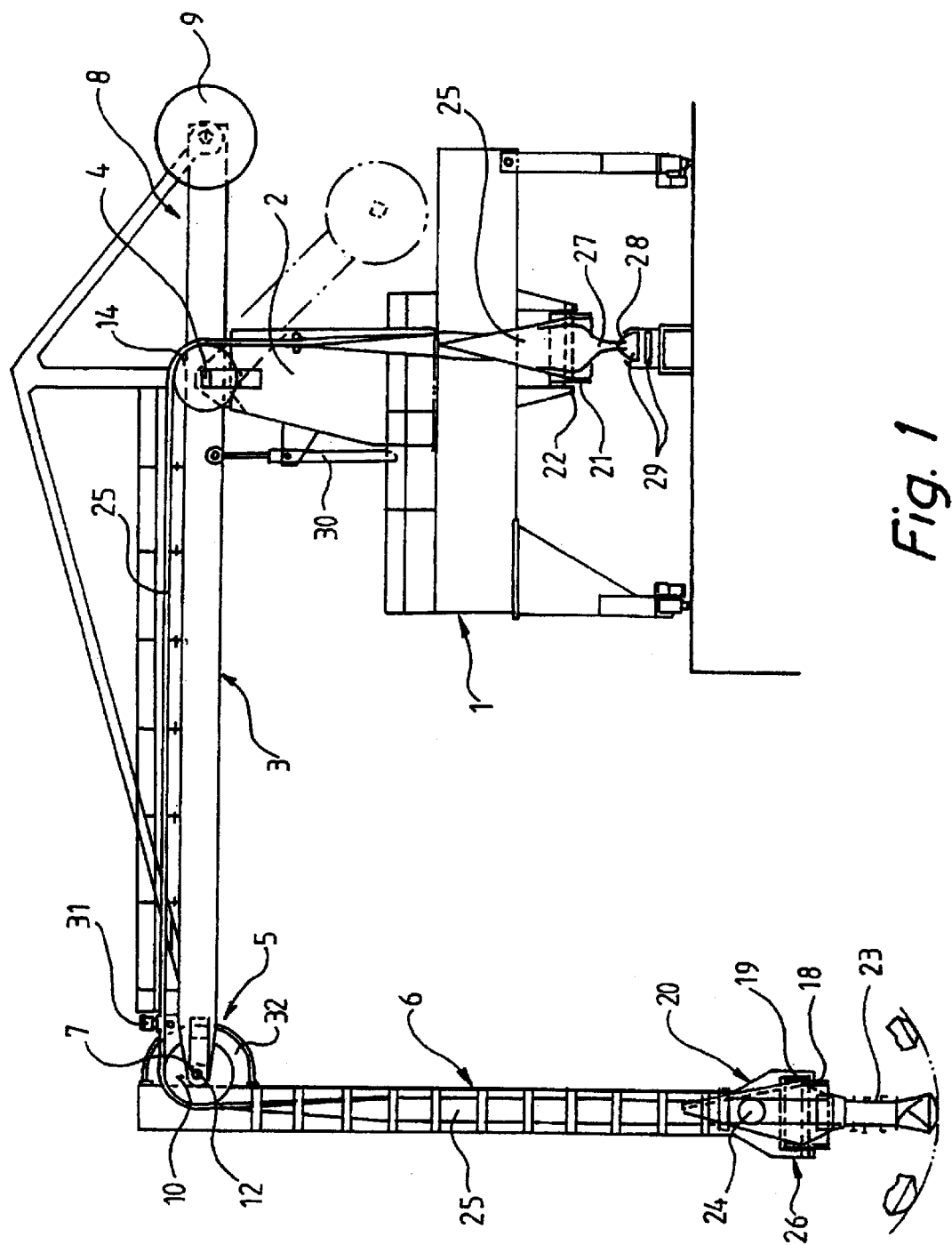
FIG. 1 is a side view of a first embodiment of a belt conveyor for unloading according to the present invention.
Figure 2:
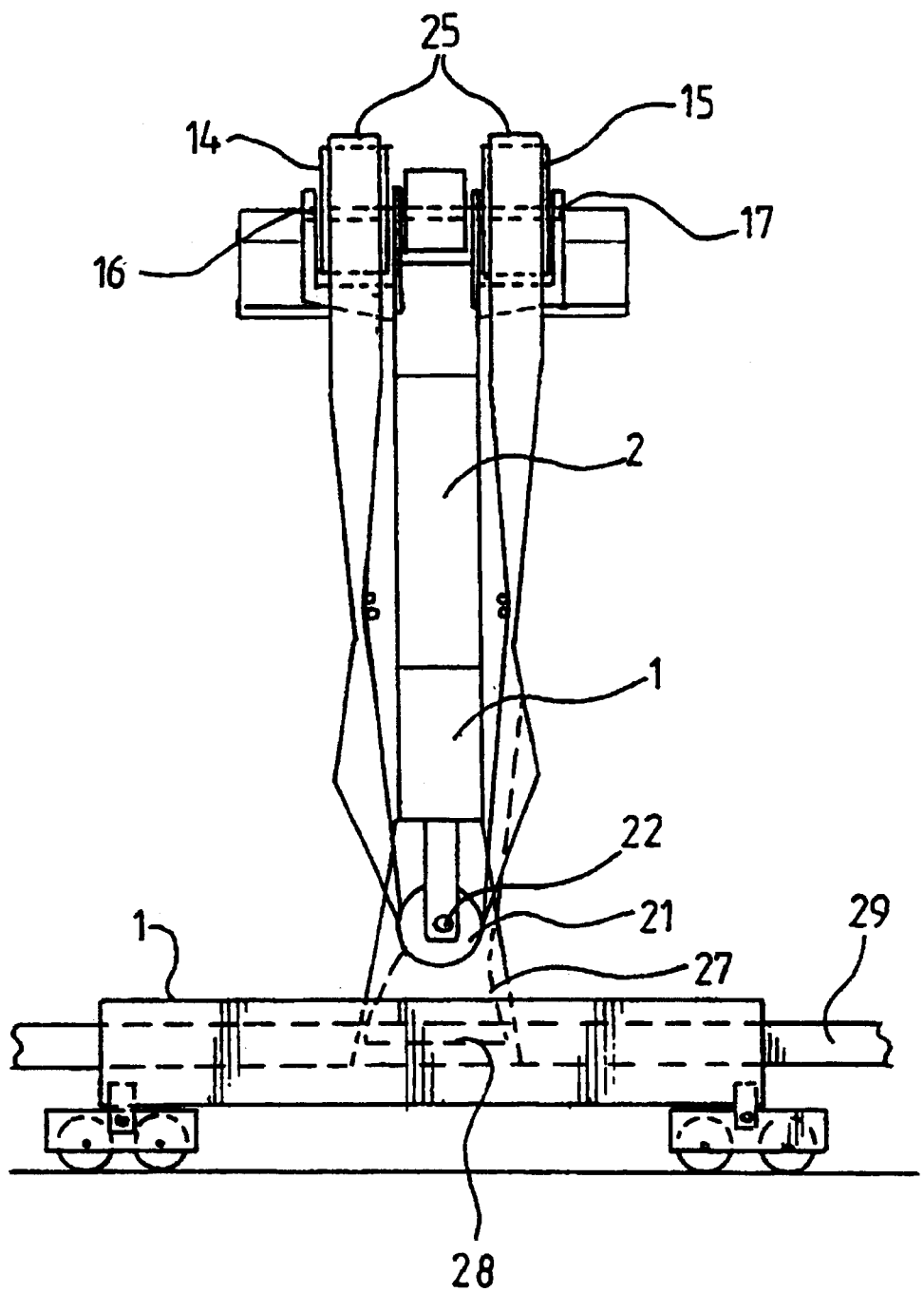
FIG. 2 is a rear end view of the belt conveyor shown in FIG. 1.

The belt conveyor illustrated in FIGS. 1–2 comprises a framework 1 including a fixed tower 2. The framework 1 may be fixed or may be moveable as illustrated, i.e. perpendicular to the plane of FIG. 1. An inner arm 3 is pivotable about an axis 4 supported by the tower 2. A first end 5 of the inner arm 3 supports an outer arm 6, which is pivotable abut an axis 7 at an intersection of the inner arm 3 and the outer arm 6. A second end 8 of the inner arm 3 supports a counterweight 9 for substantially balancing the weights of the inner arm 3 and the outer arm 6 about the axis 4.

Two deflection rollers 10 and 11 are supported, one on each side of the arms 3 and 6, for rotation on axes 12 and 13, respectively, which are coaxial with the pivot axis 7. Further, two deflection rollers 14 and 15 are supported, one on each side of the inner arm 3, for rotation on axes 16 and 17, respectively, which are coaxial with the pivot axis 4.

A terminal roller 18 has an axis 19 supported by a distal end 20 of the outer arm 6. The axis 19 is positioned substantially in a vertical plane through the inner arm 3, which plane also passes through the outer arm 6. The axes 4 and. 7 are substantially perpendicular to this vertical plane. An other terminal roller 21 is positioned below the deflection rollers 14 and 15 and has an axis 22 of rotation, which is supported by the framework 1 and is positioned substantially in said vertical plane.

At the distal end 20 of the outer arm 6, an infeeder 23, preferably of a type using a rotating screw, is supported pivotable about an axis 24 which is perpendicular to said vertical plane.

An endless conveyor belt 25 follows a path from the deflection roller 14 to the deflection roller 10 in a closed state and having its pulling power take-up side facing substantially downwards. The conveyor belt 25 then is transferred to the terminal roller 18. During this transfer, it first is twisted about 90° about its longitudinal direction and then is opened such that it follows around the terminal roller 18 in a fully unfolded state. From the terminal roller 18 the conveyor belt 25 first passes a loading station 26 where the infeeder 23 is feeding the goods to be transported towards the conveyor belt 25 while this is being closed. Having been closed, the conveyor belt 25 is twisted about 90° such that it enters the deflection roller 11 having its pulling power take-up side facing the roller 11. The endless conveyor belt 25 then follows a path from the deflection roller 11 to the deflection roller 15 in a closed state and having its pulling power take-up side facing substantially downwards. Along the following path from the deflection roller 15 to the terminal roller 21, the conveyor belt 25 first is twisted about 90° about its longitudinal direction and then is opened such that it follows around the terminal roller 21 in a fully unfolded state. From the terminal roller 21, the conveyor belt 25 is transferred back to the deflection roller 14 while first being closed and then being twisted about 90° about its longitudinal direction such that it enters the deflection roller 14 in a closed state and having its pulling power take-up side facing towards this deflection roller 14.

The terminal roller 21 is positioned in a fixed hopper 27 having a bottom outlet 28. Below this outlet 28, a second conveyor 29 is arranged for receiving the goods fed in at the distal end 20 of the outer arm 6. More precisely, the goods transported by the conveyor belt 25 from the infeeder 23, is fed out from the conveyor belt 25 when opening before reaching the terminal roller 21. There, the hopper 27 collects the goods and feeds it via its bottom outlet 28 down onto the second conveyor 29, which may be of any closed or open type for transfer of the goods to a store.

For pivoting the inner arm 3 in relation the tower 2, a drive such as a hydraulic cylinder 30 is preferably used. Also, an other drive 31 may be used for pivoting the outer arm 6 in relation to the inner arm 3, this pivoting being performed via a toothed wheel sector 32 fixed to the outer arm 6.

It should be noted that the conveyor belt 25 follows paths on either side of the arms 3 and 6, i.e. the arms 3 and 6 are centrally positioned in relation to these paths, which facilitates inspection and maintenance of the belt conveyor. Therefore, the arms 3 and 6 may have a low weight symmetric structure such as simple box beams. This conveyor belt configuration also enables large angle movements about the axes 4 and 7 which facilitates parking of the belt conveyor with the arms 3 and 6 inside critical limits. Further, since the conveyor belt 25 is not twisted in parallel configuration along parallel paths, there is no lateral bending requiring an elastic deformation of the conveyor belt. Finally, the lengths of the paths between the terminal roller 18 and the deflection rollers 10 and 11, respectively, and the lengths of the paths between the terminal roller 21 and the deflection rollers 14 and 15, respectively, may be made short only requiring a first distance for twisting the conveyor belt 90° in its closed state about the longitudinal direction thereof and a second distance for opening or closing the conveyor belt 25, i.e. transforming it from its closed state to its open state or vice versa.

Figure 3:
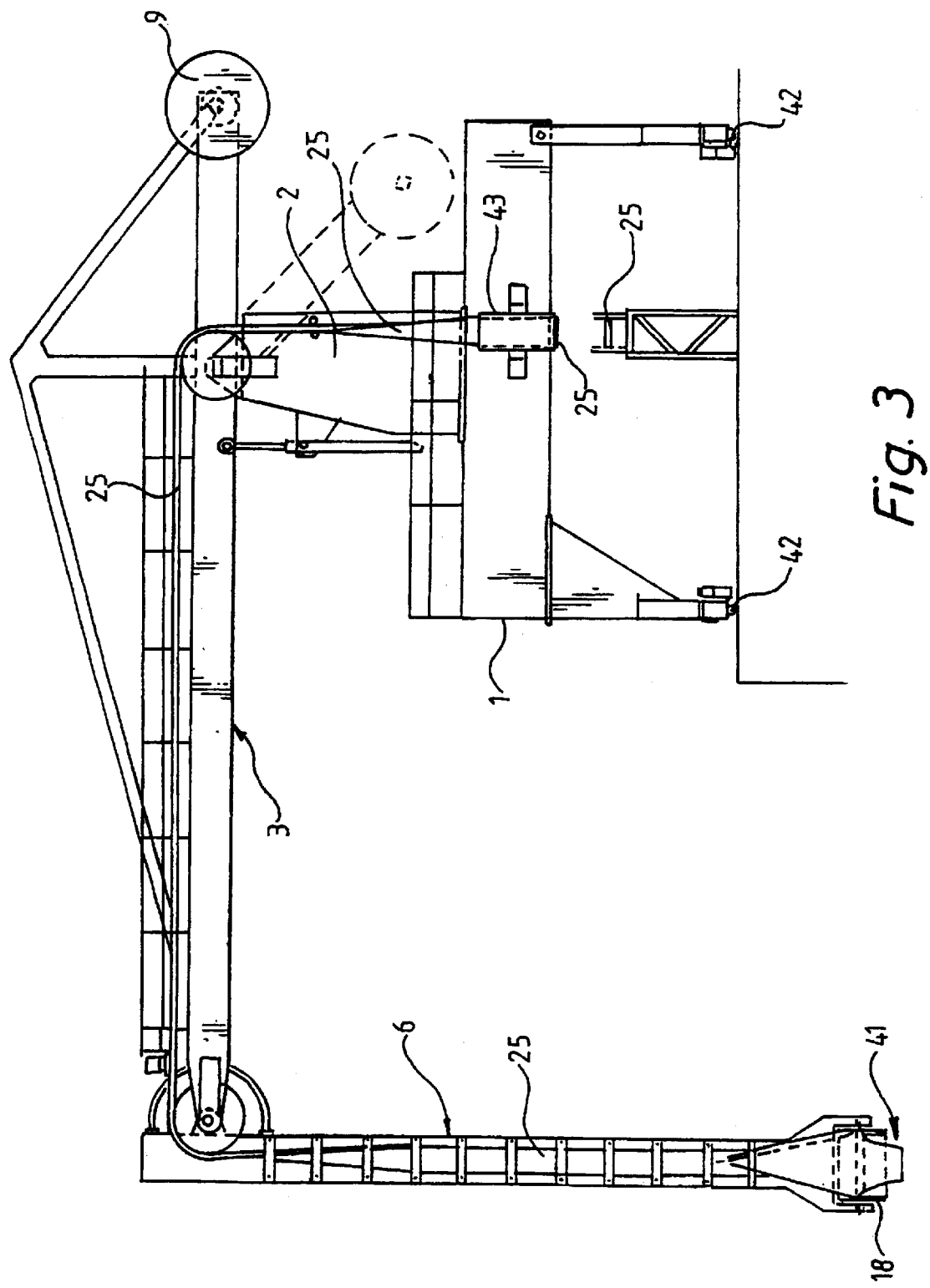
FIG. 3 is a side view of a second embodiment of a belt conveyor for unloading or loading according to the present invention.
Figure 4:
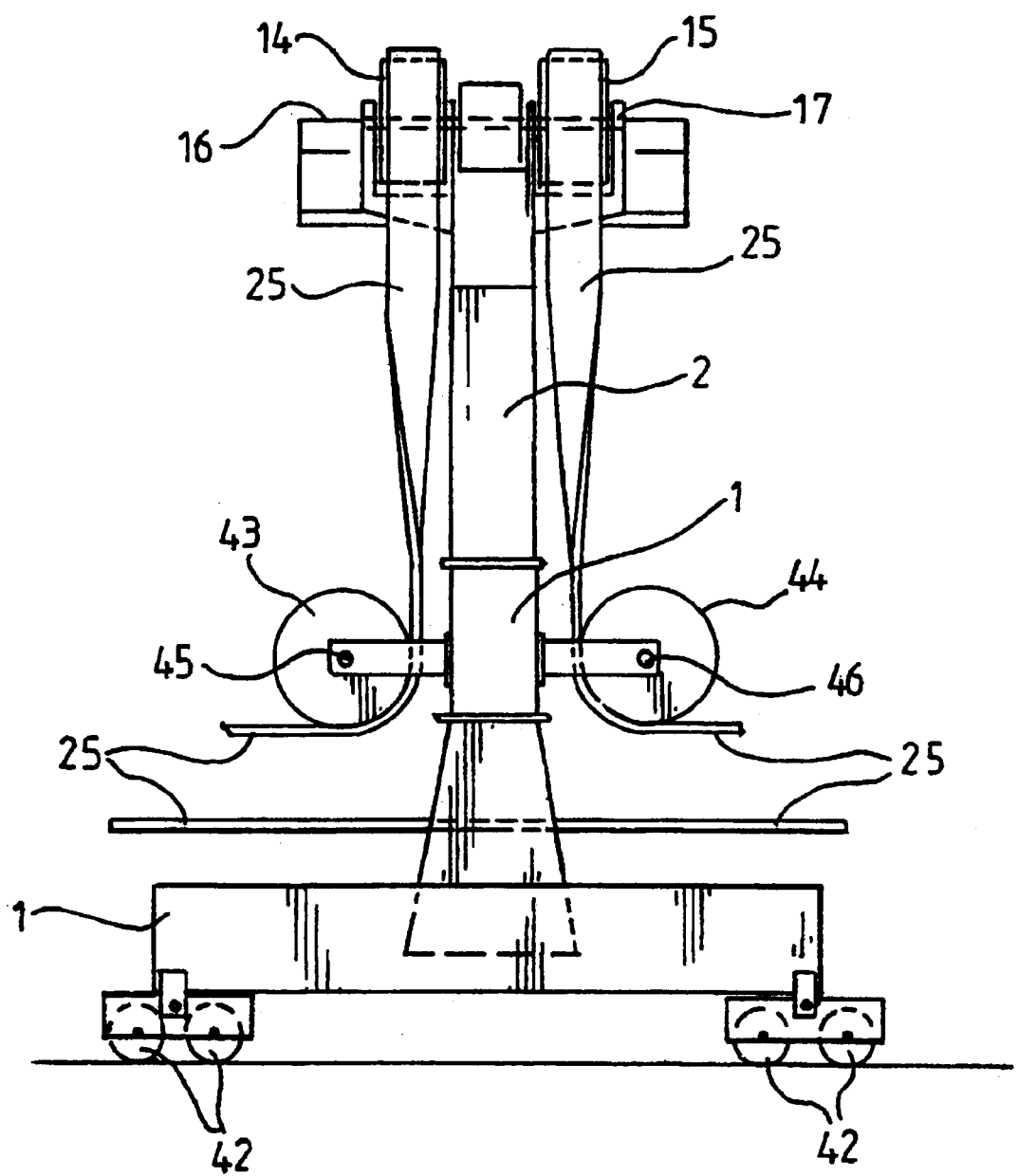
FIG. 4 is a rear end view of the belt conveyor shown in FIG. 7.
Figure 5:
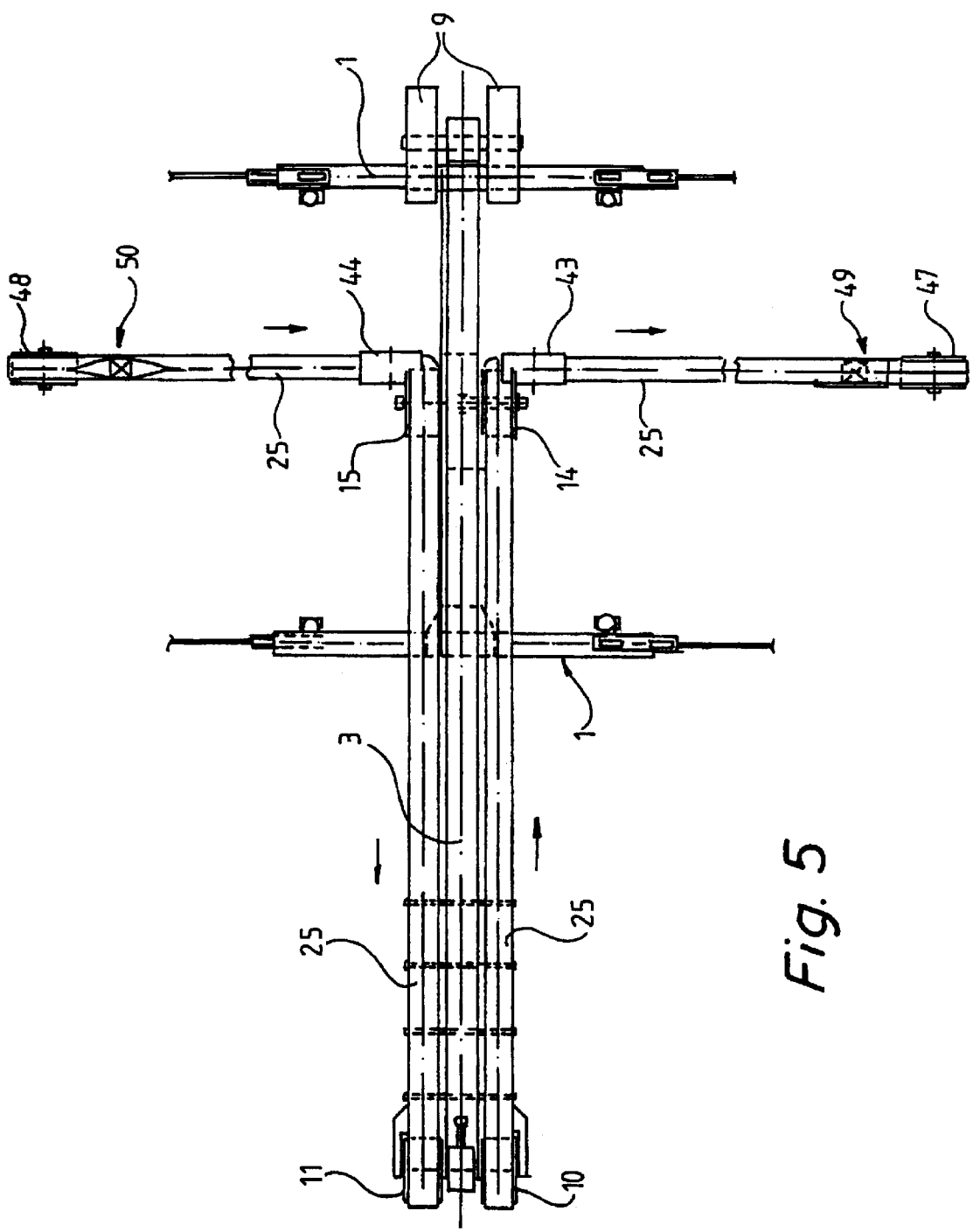
FIG. 5 is a view from above of the belt conveyor shown in FIG. 7.

The belt conveyor illustrated in FIGS. 3–5 is substantially identical to the belt conveyor shown in FIGS. 1–2 as regards the framework 1, the tower 2, the inner and outer arms 3 and 6 and the conveyor belt arrangement between these elements. However, this belt conveyor is intended for discharging goods at the end 20 of the arm 6 and therefore the infeeder 23 of FIGS. 1–2 is replaced by an outfeeder 41. The framework 1 is supported on wheels 42 such that the tower 2 and the arms 3, 6 are movable in a direction substantially perpendicular to the vertical plane through the arms 3, 6. Further, a belt arrangement of the type disclosed in U.S. Pat. No. 5,465,830 is used. More precisely, two deflection rollers 43, 44 having axes 45 and 46 respectively are supported by the framework 1 for guiding the conveyor belt 25 out along paths extending in parallel to the direction of movement of the framework 1. Thus, the belt 25 extends from the deflection roller 43 to a terminal roller 47 and back therefrom in an opposite direction to a terminal roller 48, wherefrom the conveyor belt 25 is guided back to the deflection roller 44 and then up to the deflection roller 15.

An unloading station 49 may be positioned near the terminal roller 47 for use in combination with an infeeder (such as the infeeder 23 in FIGS. 1–2) at the end 20 of the arm 6. In combination with the outfeeder 41, the belt conveyor should have a loading station 50 preferably near the terminal roller 48.

For unloading purposes alone, the conveyor belt may pass the terminal roller 18 in a folded, i.e. closed state, in which case the filling of the belt is made before the terminal roller 18.

FIGS. 6 and 7 illustrate an infeeder 23 comprising a short screw conveyor which is filling the conveyor belt 25 before this, in its movement downwards, reaches the terminal roller 18. Therefore, the conveyor belt 25 must pass over the terminal roller 18 in a closed state. This may require a terminal roller 18 having a larger diameter than when the conveyor belt 25 passes thereover in an open or unfolded state, as illustrated in FIG. 1.

FIG. 8 is a front view of the outfeeder 41 shown in FIG. 3. A tube 51 encloses the terminal roller 18 and the conveyor belt 25 passing this roller 18 in an open state, whereby the goods discharged from conveyor belt 25 when opening is directed downwards out from a lower opening 52 in the tube 51.

FIG. 9 illustrates a combined infeeder and outfeeder which may be used in the second embodiment of the belt conveyor, shown in FIGS. 3–5. More precisely, the outfeeder is substantially identical to the outfeeder shown in FIG. 8, and the infeeder corresponds to the infeeder 23 illustrated in FIG. 1. This infeeder, which comprises a screw conveyor, is filling the goods into the conveyor belt 2 when this has passed the terminal roller 18 in an open state and is closing during movement upwards towards the deflection roller 11.

The third embodiment of a belt conveyor for unloading according to the present invention, as partially shown in FIG. 10, is substantially identical with the first embodiment shown in FIGS. 1–2 except for two extra deflection rollers 52, 53 (only deflection roller 52 is shown in FIG. 10) which are inserted between the deflection rollers 14, 15 and the terminal roller 21. These deflection rollers 52, 53 have aligned axes of rotation just as the deflection rollers 14 and 15. Thereby, the second belt conveyor 29 may be displaced horizontally from the tower 2.

Figure 11:
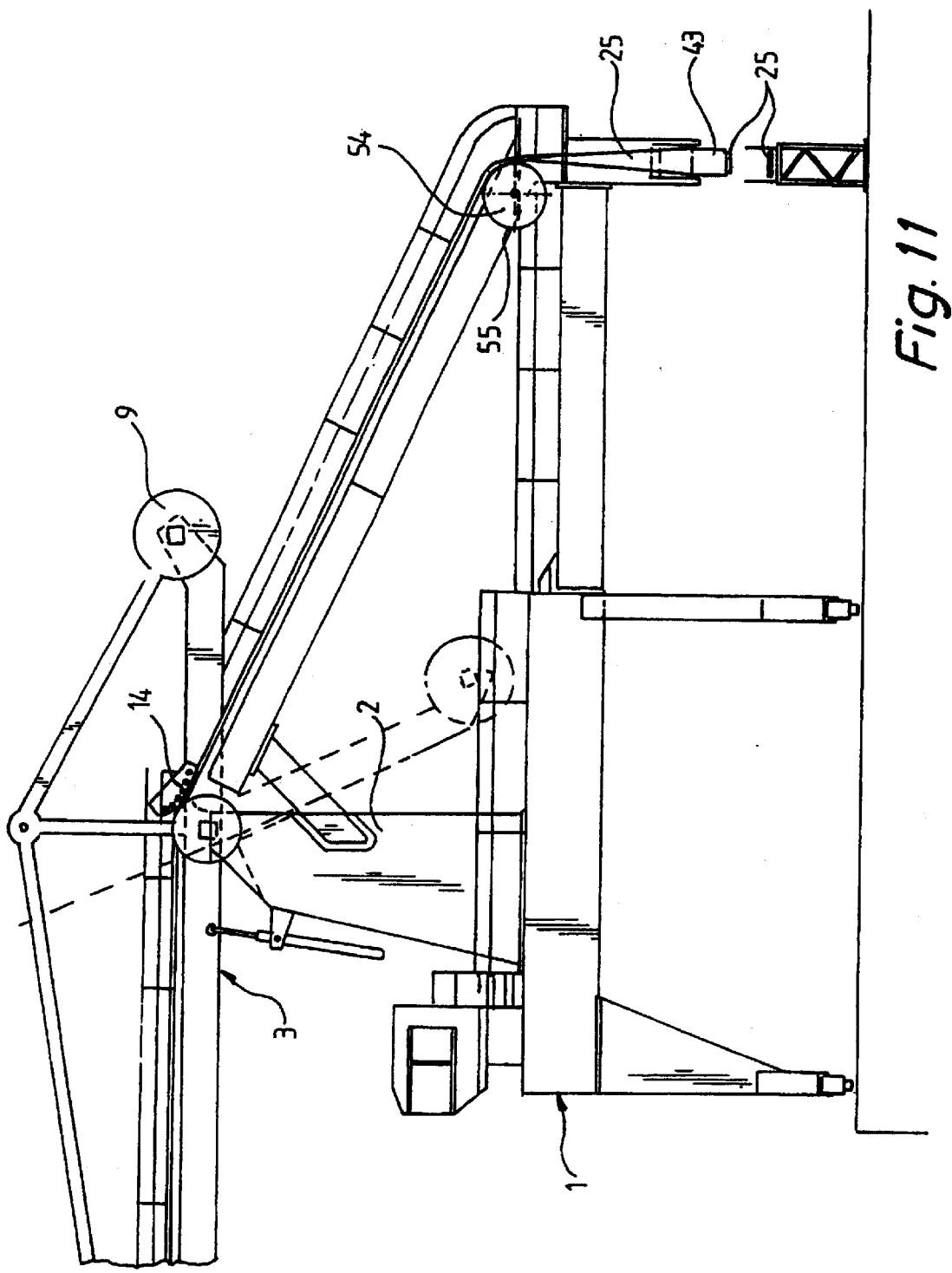
FIG. 11 is a partial side view of a fourth embodiment of a belt conveyor for loading or unloading according to the present invention.

The fourth embodiment of a belt conveyor for unloading according to the present invention, as partially shown in FIG. 11, is substantially identical with the second embodiment shown in FIGS. 3–5 except for two extra deflection rollers 54, 55 (only deflection roller 54 is shown in FIG. 11) which are inserted between the deflection rollers 14, 15 and the deflection rollers 43 and 44, respectively. Like the deflection rollers 14 and 15 the deflection rollers 54, 55 have aligned axes of rotation. Thereby, the belt conveyor 25 may be displaced horizontally from the tower 2 in its path between rollers corresponding to the rollers 47 and 48 in FIG. 5.

FIGS. 12 and 13 illustrate schematically a fifth embodiment of a belt conveyor for loading according to the present invention. A framework 61 is guiding a conveyor belt 25 vertically up along a silo 62. At the top of the silo 62 the conveyor belt 25 is guided via a roller 63 along a first arm 64 up to a substantially central position above the silo 62 and is then, via a roller 65 guided downwards along a second arm 66 into an u=loading device 67 positioned within (or above) the silo 62. The conveyor belt 25 then follows a path in the opposite direction, i.e. up from the unloading device 67 along the second arm 66 to a roller 68 corresponding to the roller 65, down along the first arm 64 to a roller 69 corresponding to the roller 65, vertically downwards while being twisted 90° about the longitudinal direction of the conveyor belt 25 to a roller 70, then to a terminal roller 71 and back therefrom to a further roller 72, wherefrom the conveyor belt 25 is guided upwards towards the roller 63. The conveyor belt loop can also operate in the opposite direction.

An infeed or loading station 73 is positioned between the terminal roller 71 and the roller 72. Further, the second arm 66 is pivotable in a vertical plane through the first and second arms 64, 66 so as to be able to distribute the goods fed out from the terminal roller 67 over the width of the silo 62 or to different additional conveyors.

Figure 15:
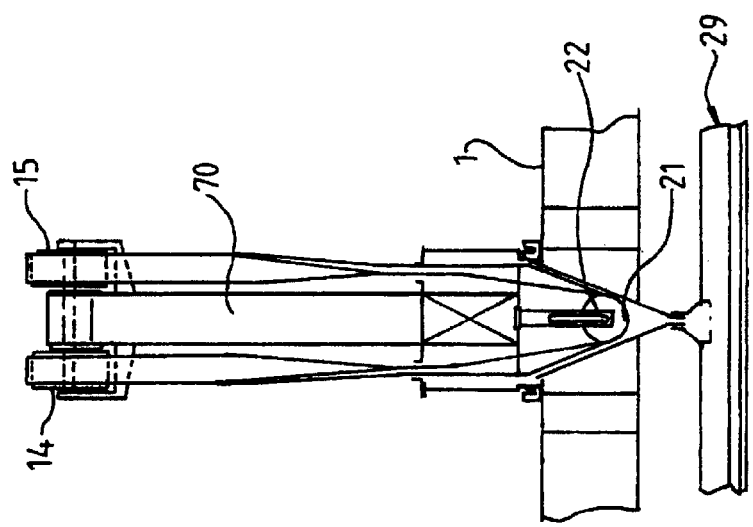
FIG. 15 is a rear end view of the modified first embodiment shown in FIG. 14.
Figure 14:
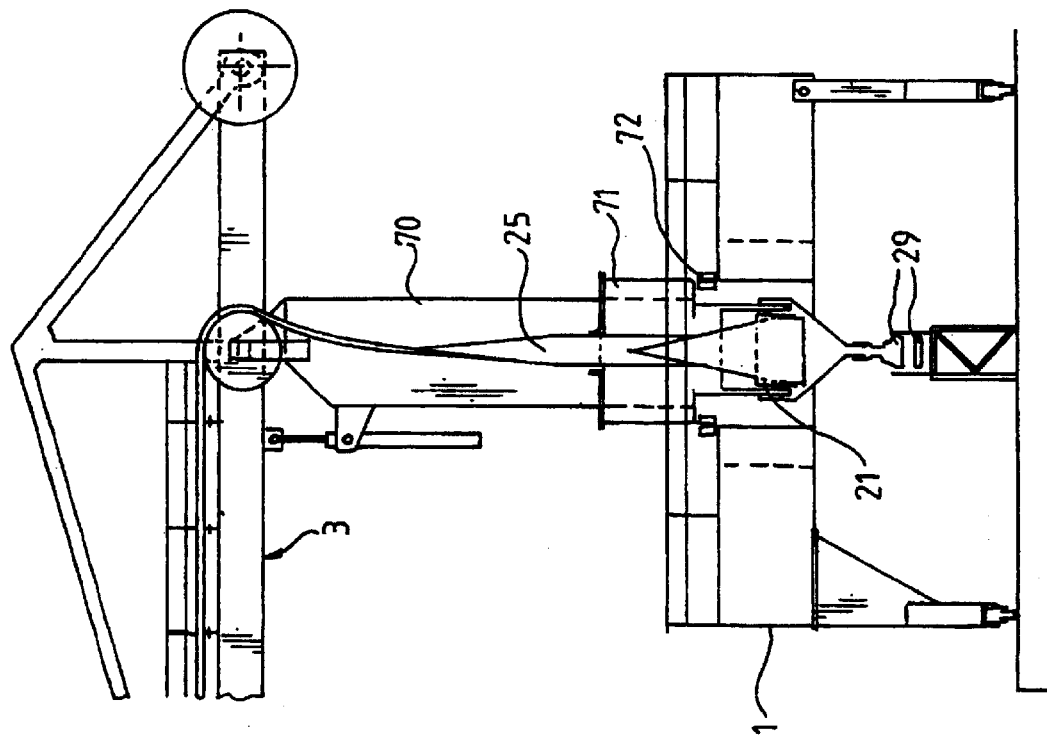
FIG. 14 is a partial side view and illustrates a modification of the first embodiment as shown in FIGS. 1–2.

In FIGS. 14 and 15, a modification of the first embodiment according to FIGS. 1–2 of a belt conveyor according to the present invention is illustrated. Here, a rotatable tower 70 is used instead of the fixed tower 2. More precisely, the tower 70 is fixed to a circular ring 71, which is supported by a circular bearing 72 on the framework 1. Further, the axis 22 of the terminal roller 21 is supported in the bottom end of the tower 70 and substantially centrally within the ring 71. Also, the hopper 27 is fixed to the tower 70 (or the ring 71) in a central position, such that the outlet 28 of the hopper 27 is centred in the same position as the tower 70 rotates in the bearing 72.

Since the terminal roller 21 rotates with the tower 70, and consequently with the deflection rollers 14 and 15, the parts of the conveyor belt 25 extending between each one of the deflection rollers 14 and 15 and the terminal roller 21 will still only be twisted 90° about the longitudinal direction of the respective part of the conveyor belt 25.

Figure 16:
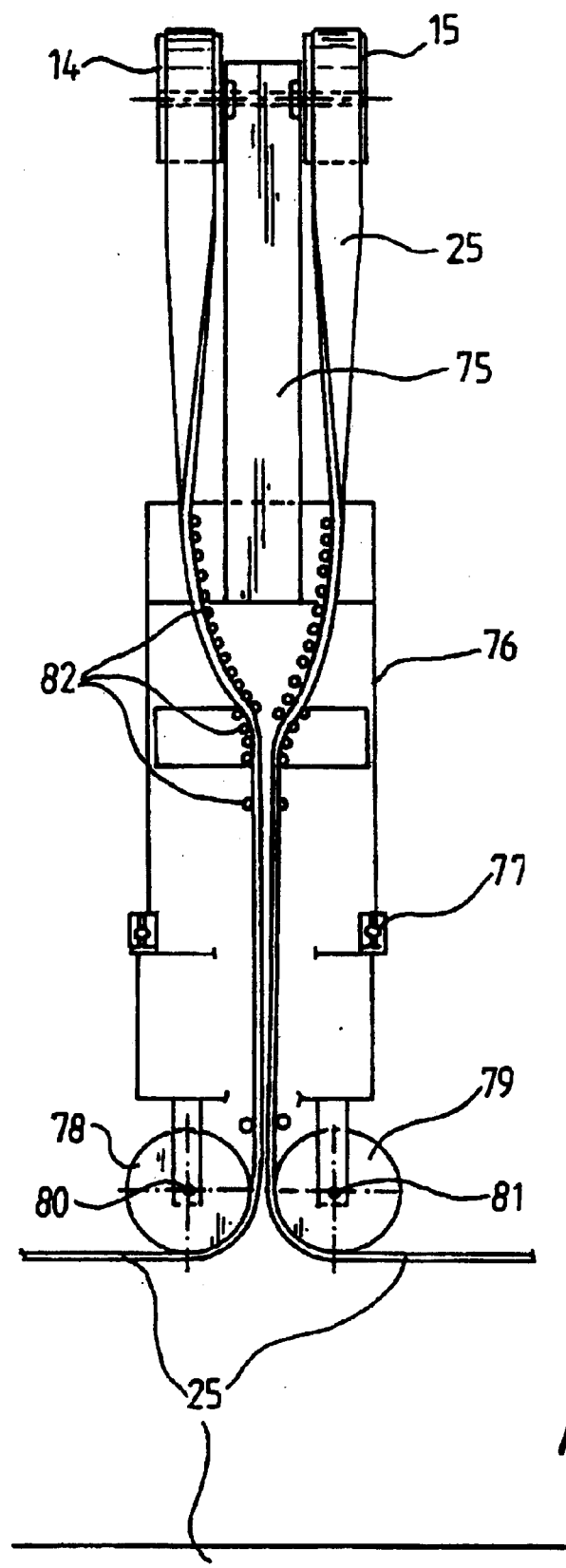
FIG. 16 is a rear end view and illustrates a modification of the second embodiment as shown in FIGS. 3–5.

FIG. 16 shows an alternative embodiment of a rotatable tower 75 which may be used in the second embodiment illustrated in FIGS. 3–5 instead of its fixed tower 2. Like the rotatable tower 70 in FIGS. 14 and 15, the rotatable tower 75 is fixed to a ring 76 journalled for rotation on a circular bearing 77 supported by the framework 1. Two deflection rollers 78, 79 have axes 80, 81 of rotation which are supported by the framework 1 and have a fixed orientation. Thus, the conveyor belt 25 in this embodiment have to extend along parallel planes close to each other, whereby a twisting of those parts results in a lateral bending thereof, i.e. a bending in a plane defined by the transverse and longitudinal directions of the conveyor belt, requiring an elastic deformation of the conveyor belt. However, this lateral bending will be rather small, since the necessary rotation of the tower 75 normally is limited to ±45° for work and to about 90° for parking purposes. A plurality of rollers 82 having axes fixed in relation to the tower 75 are used to make the conveyor belt 25 follow parallel paths which extend close to each other above the deflection rollers 78, 79.

Figure 17:
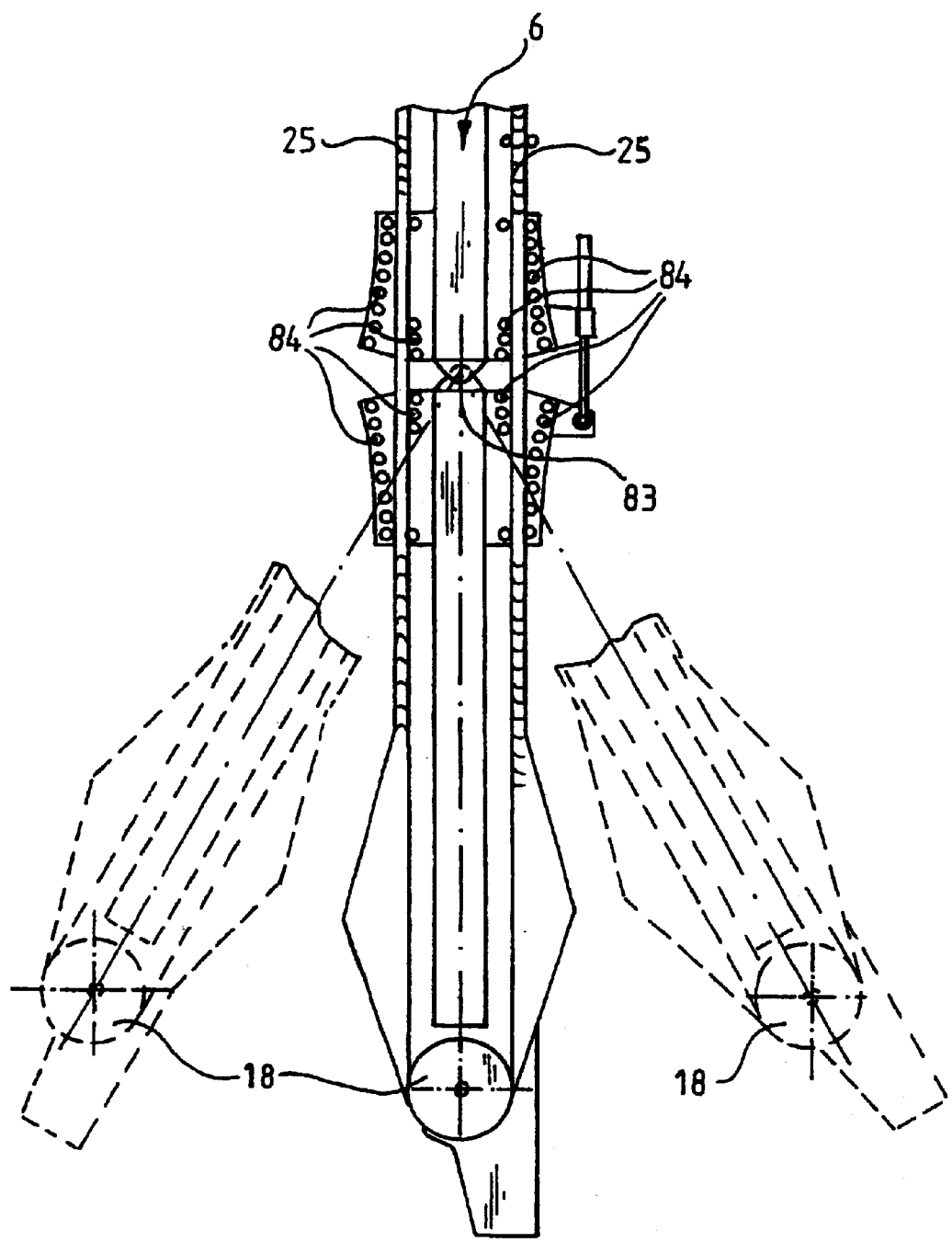
FIG. 17 illustrates a modification applicable to the first to fifth embodiments of the present invention.

To extend the area which may be reached by the infeeder 23 in FIGS. 1–2 and the outfeeder 41 in FIGS. 3–5, the arm 6 may be divided into two parts which are made pivotable in the vertical plane of the arms 3 and 6 about an axis 83, as illustrated in FIG. 17. To assist in the pivoting, a plurality of rollers 84 having axes of rotation that are perpendicular to said vertical plane, is used to guide the conveyor belt 25. In FIG. 17, an outfeeder 85 corresponding to the outfeeder of FIG. 8 is schematically shown.

It will be apparent to those of skill in the art that modifications can be made to the above-described embodiments without departing from the scope of the invention. For example, other types of infeeder than the screw type may be used. Accordingly, such embodiments are exemplary in nature and are not intended as limitations thereof as the scope of the invention is to be limited solely in accordance with the following claims.

What is claimed is:

1. A belt conveyor comprising an endless and closed conveyor belt which is flexible essentially merely about axes which are parallel with a transverse direction of the belt, a tower, an inner arm supported by the tower, and an outer arm supported by the inner arm and positioned substantially in a vertical plane through the inner arm, two first deflection rollers for the conveyor belt, and a first terminal roller for the conveyor belt, the conveyor belt following a path from the tower, via the inner arm and the outer arm to a distal end of the outer arm and back via the outer arm and the inner arm to the tower, wherein the two first deflection rollers are supported side by side at an intersection of the inner arm and the outer arm and have a common axis of rotation which is perpendicular to the vertical plane, and wherein the first terminal roller is supported at a distal end of the outer arm and has an axis of rotation which is positioned in the vertical plane.

2. The belt conveyor of claim 1, wherein the tower is rotatable about a vertical axis.

3. The belt conveyor of claim 1, wherein the tower is movable along a path extending perpendicular to the vertical plane.

4. The belt conveyor of claim 1, wherein the inner arm is pivotable in the vertical plane about an axis supported by the tower and perpendicular to the vertical plane.

5. The belt conveyor of claim 4, wherein the tower supports two second deflection rollers for the conveyor belt side by side with an axis of rotation common to the axis supported by the tower for the pivoting of the inner arm.

6. The belt conveyor of claim 4, wherein the tower is rotatable about a vertical axis.

7. The belt conveyor of claim 1, wherein the outer arm is pivotable in the vertical plane about an axis perpendicular to the vertical plane at an intersection of the outer arm and the inner arm.

8. The belt conveyor of claim 7, wherein the inner arm is pivotable in the vertical plane about an axis supported by the tower and perpendicular to the vertical plane.

9. The belt conveyor of claim 7, wherein the tower supports two second deflection rollers for the conveyor belt side by side with an axis of rotation common to the axis supported by the tower for the pivoting of the inner arm.

10. The belt conveyor of claim 7, wherein the tower is rotatable about a vertical axis.

11. The belt conveyor of claim 1, further comprising two second deflection rollers for the conveyor belt, wherein the tower supports the two second deflection rollers side by side with an axis of rotation common to the axis supported by the tower for the pivoting of the inner arm.

12. The belt conveyor of claim 11, wherein the tower is rotatable about a vertical axis.

13. The belt conveyor of claim 11, further comprising a second terminal roller for the conveyor belt, wherein the second terminal roller has an axis of rotation which is positioned substantially in the vertical plane, is supported below the two second deflection rollers and closes the conveyor belt path.

14. The belt conveyor of claim 13, further comprising two third deflection rollers for the conveyor belt, wherein the two third deflection rollers having have a common axis of rotation parallel to the common axis of rotation of the two second deflection rollers, and are positioned between the two second deflection rollers and the second terminal roller.

15. The belt conveyor of claim 13, wherein the tower is rotatable about a vertical axis.

16. The belt conveyor of claim 11, further comprising two further deflection rollers, wherein the two further deflection rollers have axes of rotation that are substantially parallel with the vertical plane, are supported below the two second deflection rollers for deflection of the conveyor belt along a path extending substantially perpendicular to the vertical plane between two terminal rollers.

17. The belt conveyor of claim 16, further comprising two fourth deflection rollers for the conveyor belt, wherein the two fourth deflection rollers have a common axis of rotation parallel to the common axis of rotation of the two second deflection rollers, are positioned between the two second deflection rollers and a respective one of the two further deflection rollers.

18. The belt conveyor of claim 16, wherein the tower is rotatable about a vertical axis and the conveyor belt follows a path via at least one other deflection roller having an axis of rotation in a position which is fixed relative to the tower between each one of the second deflection rollers and the corresponding deflection roller of the further deflection rollers.

* * * * *